2,868,721

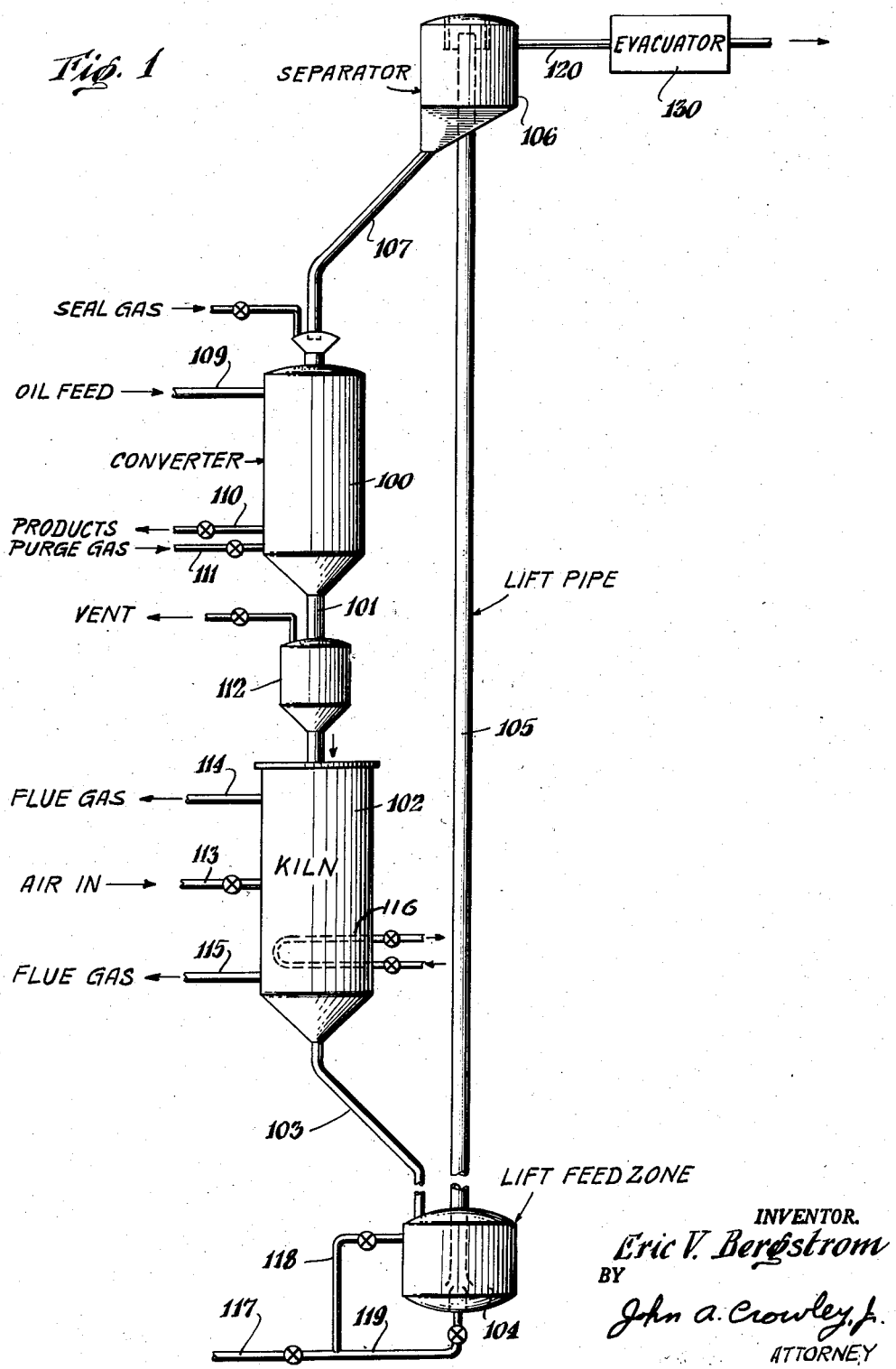

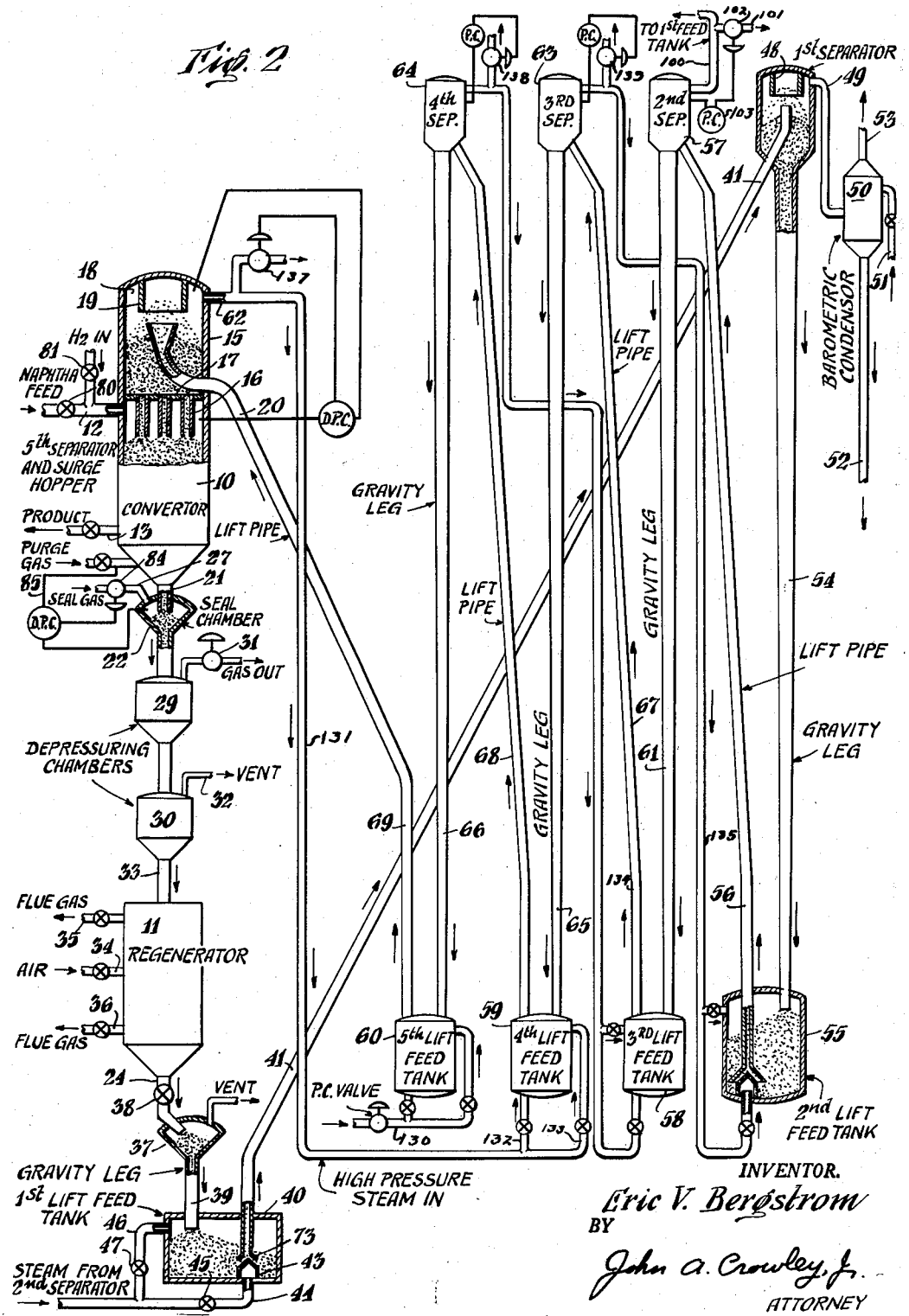

CATALYST TRANSFER IN A CYCLIC HYDROCARBON CONVERSION PROCESS

Eric V. Bergstrom, Short Hills, N. J., assignor to Socony Mobil Oil Company, Inc., a corporation of New York Application November 17, 1953, Serial No. 392,599

5 Claims. (Cl. 208—174)

This application is a continuation-in-part of application Serial Number 124,464, filed in the United States Patent Office October 29, 1949, now abandoned.

This invention pertains to processes for treatment of fluid hydrocarbons in the presence of granular contact materials. Typical of the processes to which the invention pertains is the catalytic cracking of petroleum fractions such as gas oils at elevated temperatures and pressures usually within the range about 0 to 100 pounds per square inch gauge to form gasoline containing products. Another typical process is the catalytic reforming of petroleum fractions boiling within and near the gasoline range in the presence of suitable catalysts and hydrogen and at temperatures within the range about 800–1100° F. and preferably 900–1050° F. and pressures within the range about 30–1000 and preferably 40–400 pounds per square inch to produce a dehydrogenated or otherwise chemically reconstructed product of anti-knock characteristics superior to those of the starting material. Usually there is little or no net consumption of hydrogen, or a net production of hydrogen from the process. Besides dehydrogenation the reforming may include such reactions as isomerization, aromatization, desulfurization, alkylation and cyclization. Other processes to which the invention pertains are processes for pyrolytic conversion of hydrocarbons over moving granular inert materials or for desulfurizing or treating petroleum fractions over suitable moving granular adsorbents.

The contact material employed in such processes may be selected from a wide variety of materials. For reforming catalysts the oxides or sulfides of the metals of the II, IV, V, VI and VIII groups of the periodic system, especially tungsten, chromium, vanadium, molybdenum, cobalt and nickel deposited upon natural or activated clays or synthetic gels, activated alumina, magnesia and the like. Suitable cracking catalysts are natural or activated clays and synthetic associations of silica, alumina, magnesia or combinations thereof to which may be added small amounts of other metal oxides for specific purposes. This invention is directed to processes wherein the catalyst is in granular form, the term granular being employed to include tableted, pelleted, spherical or pieces of regular or irregular shape. The average particle diameter should be broadly within the range about 0.006 to 0.25 inch.

This invention is specifically concerned with a method for transferring catalyst between reaction and regeneration zones in a cyclic hydrocarbon conversion process in which the catalyst is continuously circulated in a cyclic path including the reaction and regeneration zones. It has been customary in recent commercial cyclic hydrocarbon conversion systems to employ pneumatic lifts for transferring the catalyst from the location below one of the contacting zones to a location above or within the other contacting zone. These lifts have been of a pressure type depending upon a suitable lift gas introduced under pressure into a confined lift feed zone to effect elevation of the catalyst to the desired location. In such systems the problem arises as to the method for introduction of catalyst into the confined lift zone in a practical continuous manner. The prior art has suggested the passage of the catalyst from the bottom of one of the contacting zones maintained under pressure through a confined downwardly extending conduit into the lift feed zone maintained usually under a lower pressure or at least under a pressure not substantially above that in the contacting zone. Such systems involve the disadvantage of possible fire or explosion hazards arising in the event of loss of the catalyst leg in the continuous unobstructed conduit extending between the lift feed zone and the contacting vessel feeding the same. A further disadvantage of such systems lies in the fact that the pressure conditions within the lift feed zone and the contacting zone feeding the same are to some extent interdependent, a sudden substantial change in the pressure in one of these zones causing an upset in the pressure conditions in the other. In order to avoid the above difficulties, it has recently been proposed to pass the catalyst downwardly as a compact confined stream of restricted cross section from the contacting zone to a location vented to the atmosphere from which location the catalyst flows downwardly as a compact confined unobstructed vertical column of restricted cross section into the pressurized lift feed zone. Such improvement is the subject matter of claims in Serial Number 80,866, filed in the United States Patent Office March 11, 1949, now Patent Number 2,697,685.

While the method above described is a very substantial and important improvement over prior practices, it requires the use of a gravity feed leg of substantial length to feed the catalyst into the lift feed zones whenever the operating conditions of the lift involve maintenance of substantial superatmospheric pressure within the lift feed zone. Similar long gravity feed legs are required to feed catalyst from the contacting zone to the lift feed zone against pressure therein in those operations wherein it may be desirable to maintain a lower pressure in the contacting zone than that required in the lift feed zone, even though no vent is provide in the conduit for catalyst transfer between these zones.

It is, of course, desirable to limit the overall height of commercial cyclic conversion systems to a minimum and to the extent that elongated gravity feed legs prevent this, they are undesirable particularly when located below the reactor and kiln vessels. The problem is particularly perplexing when it becomes desirable to employ, in older commercial units which were originally built with bucket elevators or lifts operating at relatively low pressure drops, new pneumatic lift systems requiring substantially higher pressures in the lift feed zone. In such systems sufficient head room is not available between the contacting vessel and the lift feed zone to which the catalyst is to flow from said contacting vessel for installation of gravity feed legs of the required length.

It is a major object of this invention to provide an improved cyclic conversion process in which a granular contact material is passed continuously through reaction and contact material reconditioning zones and in which the contact material is circulated by a pneumatic lift.

It is a specific object of this invention to provide in a process for conversion of hydrocarbons in which a granular catalyst is passed cyclically through a hydrocarbon conversion and through a catalyst regeneration zone, an improved method for transferring the catalyst from one of said zones to a higher level above the other contacting zone.

It is another specific object of this invention to provide in a cyclic conversion system in which catalyst is passed cyclically through two contacting zones, namely reaction and regeneration zones, and in which catalyst from one of said zones is introduced into a lift feed zone maintained under superatmospheric pressure from a region existing at a substantially lower pressure than that within the lift feed zone, of an improved method for effecting pneumatic transfer of catalyst to a higher location above the other contacting zone without the requirement for excessively long gravity feed legs between the lift feed zone and the contacting zone supplying the same.

These and other objects of this invention will become apparent from the following discussion.

In one form of this invention catalyst is passed cyclically through a hydrocarbon cracking conversion zone and through a regeneration zone and is withdrawn near ground level from the bottom of one of said zones, usually the regeneration zone, and passed onto the surface of an upright compact gravity feed column, vertical along at least the major portion of its length, the surface of which column is maintained at or near atmospheric pressure by venting the same. The catalyst flows downwardly by gravity through the gravity feed column into a confined lift feed region wherein it is suspended in a stream of suitable lift gas supplied at a pressure above atmospheric pressure and passed upwardly through a confined passage to a separation zone located above the other contacting zone. Catalyst is separated from the lift gas in the separation zone and the lift gas is sucked from the separation zone to maintain it under a substantial vacuum and thereby aid in the lifting of the catalyst through the lift stream. The total pressure drop across the lift stream is substantially greater than the calculated head of catalyst in the gravity feed column supplying the lift feed region but the superatmospheric pressure existing in the lift feed region is only a fraction of the total pressure drop across the lift passage and is less than the calculated head in the gravity feed column. In many operations the pressure drop across the lift passage may be substantially in excess of the amount of vacuum which could be feasibly developed commercially.

The invention may be applied to a process wherein catalyst is transferred from one contacting zone operated under a relatively low pressure to a second contacting zone operated under a substantially higher pressure. According to this form of the invention, catalyst may be passed through a catalytic reforming zone, for example, wherein it contacts a hydrocarbon feed to effect the desired effect thereof. The catalyst then passes through a depressuring zone wherein its pressure is reduced nearly to atmospheric pressure. The depressured catalyst passes through a regeneration zone wherein it is contacted with an oxygen containing gas to burn off carbonaceous deposits formed on the catalyst in the reforming zone. Catalyst is withdrawn from the regeneration zone at a pressure near atmospheric and caused to flow downwardly as a substantially compact feed stream or column vertical along at least most of its length until it reaches a location or zone under gaseous pressure where it is mixed with a stream of lift gas. The catalyst is carried upwardly by a lift gas to a separation zone maintained under vacuum in the manner described hereinabove. The catalyst is then caused to flow through a series of sets of compact feed streams and lift streams arranged side by side alongside the reaction and regeneration zones, the density of the catalyst in the lift streams being maintained substantially less than in the compact feed streams so that the effective gaseous pressure drop is much less across a unit length of lift stream than across the same length of gravity feed stream. The operation is so controlled as to ultimately effect the transfer of the catalyst to a receiving zone maintained above the reforming zone under a pressure near that existing in the reforming zone. The catalyst may then flow by gravity through a short leg into the high pressure reforming zone. A suitable lift gas preferably steam under pressure is delivered to the lower end of the last lift stream in the series. This steam is withdrawn from each separation zone under pressure and reused at a lower pressure as the lift gas in the next preceding lift stream so that the same steam is employed in series through all the lift streams in opposite order to the catalyst advance.

This invention may be more readily understood by reference to the drawings attached hereto of which Figure 1 is an elevational view, partially in section, of the broad form of this invention.

Figure 2 is an elevational view, partially in section, of a preferred arrangement for conducting this invention in a cyclic system involving a low pressure regenerator and a power pressure converter.

Turning now to Figure 1, there is shown a cyclic system for catalytic cracking of hydrocarbons, for example, petroleum gas oils. In this operation catalyst is circulated through a converter 100 downwardly through a conduit 101 to a kiln 102 and then downwardly through a conduit 103 and lift feed zone 104, from which it is conveyed upwardly through lift passage 105 to separator 106. The catalyst then returns through gravity feed leg 107 to the converter.

As an example of a typical operation, a mixture of vaporized and liquid hydrocarbons may be supplied into the upper section of the converter 101 through pipe 109 and then passed downwardly through a bed of granular catalyst maintained at a temperature within the range 800–1050° F. to effect conversion. Gasoline containing products are withdrawn from the converter through conduit 110. The converter may be maintained under a pressure of about 10 pounds per square inch at its upper end and 5 pounds per square inch gauge at its lower end. The catalyst passes through the lower section of the converter to countercurrently contact an inert stripping gas such as steam, introduced at 111 and then passes through conduit 101 into chamber 112 wherein its pressure is released to substantially atmospheric pressure. The catalyst then passes downwardly into the kiln and through the kiln as a substantially compact moving bed. Air is introduced into the kiln at an intermediate section via conduit 113 and combustion gases are removed from the kiln via outlets 114 and 115 adjacent opposite ends of the kiln. The kiln pressure adjacent the outlet 115 may be quite low, for example, one pound per square inch gauge or less. The regenerated catalyst from which coke has been removed by burning may be adjusted in temperature by means of cooling coils 116 and thereafter it passes downwardly through the closed conduit 103 into the lift feed zone 104. The conduit 103 is preferably vertical along most of its length and should be unobstructed along its length. It should have a cross section which is very substantially less than either that of the regenerator or that of the lift feed zone. The catalyst is preferably delivered onto a compact bed thereof in the lift feed zone from under the surface of which it is lifted upwardly into the lift passage 105. Suitable lift gas may be supplied to the lift feed zone from the main gas transfer conduit 117 via secondary gas inlet 118 and primary gas inlet 119. A suitable lift feed zone and method for introducing the catalyst into the lift passage is shown in applicant's Serial Number 76,017, filed February 12, 1949, now Patent Number 2,666,731. In this particular operation it may be desirable to employ air as a lift gas and this gas is separated from the catalyst in the separator 106. Air is removed from the upper section of the separator via pipe 120 by means of a suitable conventional suction creating device 130 so that the separator 106 is maintained under a substantial vacuum. For example, the absolute pressure in the separator 106 may be maintained at one pound per square inch absolute, while the pressure in the lift feed region 104 may be maintained at 17 pounds per square inch absolute. In this operation the stream density within the lift taken together with the overall lift height are such as to require a pressure drop across the lift passage of 16 pounds per square inch. It will be noted that in the absence of the use of vacuum at the upper end of the lift passage, the pressure in the lift feed region would have to be 31 pounds per square inch absolute and the length of the gravity feed leg required to feed catalyst into this zone from the kiln operating at 16 pounds per square inch absolute would be substantially in excess of 60 feet. This would require elevation of the reactor and kiln and separator to undesirably high levels, greatly increasing the cost of the structural steel for supporting the same. However, by the method described hereinabove, the length of the vertical portion of the conduit 103 need only be of the order of 5 to 10 feet, i. e., very substantially less than that which would be required to lift catalyst into the feed zone of a lift accomplishing the entire lift job by pressure alone. Catalyst from separator 106 passes downwardly through the gravity feed leg 107 which is of sufficient length and restricted cross section to permit gravity flow from the catalyst into the reactor 100 against the pressure differential existing between the reactor and separator 106.

Turning now to Figure 2, there is shown a continuous catalytic reforming process in which the invention may be applied in connection with a system for building up the pressure on the catalyst stream. In Figure 2 there is shown a conversion chamber 10 positioned above a regeneration vessel 11. The conversion vessel is provided with a reactant inlet conduit 12 and a reactant outlet conduit 13. Suitable vapor collecting members (not shown) are provided within the lower section of vessel 10 in association with the outlet 13. A combined separation and catalyst surge hopper 15 is provided above the conversion chamber 10 and pipes 16 depend from the chamber defining partition 17 for flow of catalyst between chambers. A cylindrical baffle 19 depends from the top of chamber 15 so as to leave an annular space 18 between baffle 19. A catalyst lift pipe 20, flared on its end, terminates just below the central space confined by baffle 19 and a gas outlet pipe 62 connects through the chamber wall into the annular space 18. A catalyst drain conduit 21 extends vertically down from the bottom of chamber 10 to a seal chamber 22 several feet therebelow. A suitable baffle arrangement (not shown) may be provided in the lower section of chamber 10 above conduit 21 to insure uniform flow of catalyst from all portions of the chamber cross section to conduit 21. A similar arrangement may be provided in the vessel 11 above its catalyst drain conduit 24. A baffle arrangement of this type is described and claimed in United States Patent 2,412,136 issued December 3, 1946.

A seal gas inlet 27 connects into the top of seal chamber 22. Catalyst flows from the seal chamber 22 through depressuring chambers 29 and 30. These chambers are adapted to effect release in the gaseous pressure without break of the solid catalyst stream between reactor and regenerator and without loss of catalyst with the gas withdrawn via pipes 31 and 32 from the tops of chambers 29 and 30 respectively. Suitable depressuring chamber constructions are described and claimed in United States Patent 2,448,272 issued August 31, 1948. If desired, the total depressuring may be effected in one or in more than two depressuring chambers. Catalyst flows from the lower chamber 30 through a short conduit 33 to the regenerator 11. The regenerator is provided with a central air inlet 34 and with air outlets 35 and 36 near its opposite ends. If desired, heat transfer tubes (not shown) may be provided in a manner known to the art within the regenerator for purpose of catalyst temperature control. A drain conduit 24, bearing flow control valve 38 is connected to the bottom of the regenerator. This conduit delivers the catalyst into vented hopper 37 which is positioned at the upper end of the vertical gravity leg 39. This leg is preferably of tapered construction, its diameter gradually decreasing at successively lower levels. The leg 39 delivers into the upper section of a first lift feed tank 40. A lift pipe 41, having a flared lower end extends upwardly from a point shortly above the bottom of tank 40 to a separator 42 positioned at an elevation above the converter. A gas distributor manifold 43 having a perforated conical roof extends up from the bottom of tank 40 directly below the flared lower end of pipe 41 so as to leave an annular passage 73 for catalyst entry into the lift pipe. A gas inlet pipe 44 having a flow control valve 45 thereon connects through the bottom of tank 40 below the manifold 43. A second gas inlet 46, having a flow control valve 47 thereon connects into the upper section of tank 40. A cylindrical baffle 48 depends a short distance down from the top of the separator 42 and terminates centrally above the discharge end of lift pipe 41. A gas outlet 49 connects into the space around the baffle 48 and connects on its other end into a barometric condenser 50. The barometric condenser 50 is provided with a water inlet 51, a barometric leg 52 and an outlet 53 for non-condensed gas. If desired, a suitable ejector (not shown) may be connected to the outlet 53. A vertical, tapered gravity leg 54 extends down from the bottom of separator 42 to a second lift feed tank 55 located at about the same level as tank 40. The internal construction of tank 55 is similar to that of tank 40. A lift pipe 56 extends up from tank 55 to a second separator 57, similar in construction to separator 42. Additional feed tanks 58, 59 and 60 and separators 63 and 64, and gravity legs 61, 65 and 66 and lift pipes 67 and 68 are provided in a series arrangement. A final lift pipe 69 extends upwardly from the fifth feed tank 60 into the combined separator and hopper 15.

As a typical example of the operation the application of this invention to the reforming of a naphtha charging stock containing mostly paraffinic and olefinic hydrocarbons may be considered. The naphtha feed having, for example, a 10 percent A. S. T. M. boiling point of 300° F. and an end point of 425° F. is introduced from conduit 80 into reactor inlet 12 at a temperature of about 950° F. Hydrogen in the ratio of about 5 mols of hydrogen to one mol of hydrocarbon charge is introduced via pipe 81. A pressure of about 162 pounds per square inch gauge is maintained in the upper section of the reactor 10 and a pressure of about 163 pounds per square inch is maintained in chamber 15. The reactant passes downwardly through a moving compact column of granular catalyst comprising particles of activated alumina with molybdenum oxide deposited thereon, for example. The catalyst may be of the order of 4–20 mesh size by Tyler standard screen analysis. The spent catalyst is purged with steam or flue gas supplied via a suitable pipe connected into the lower section of chamber 10 and then flows through a short leg into seal zone 22 wherein there is maintained steam or flue gas under pressure slightly above that in the lower section of the reactor. The pressure differential is maintained by controlling the rate of seal gas supply to zone 22 by means of diaphragm valve 84 operated by differential pressure controller 85. The catalyst then flows as a compact stream of restricted diameter to a depressuring zone 29 wherein the pressure is reduced to 80 pounds per square inch and then to a second zone 30 wherein the pressure is reduced to atmospheric. A limited amount of seal gas from zone 22 is released from zones 29 and 30 via pipes 31 and 32 respectively. A short leg 33 leads into the regenerator wherein the carbonaceous contaminant deposited thereon is burned with air or other gas containing free oxygen, which is passed through the catalyst column in the regenerator at a pressure near atmospheric, for example, about 2 pounds per square inch gauge. The temperature of the catalyst is controlled below about 1100° F. during its regeneration. Regenerated catalyst then flows from the vessel 11 at a suitable rate controlled by valve 38 to the hopper 37. The catalyst flows as a compact stream downwardly through the vertical leg 39 onto the bed within tank 40. This bed is in effect a continuation of the gravity leg and contact material passes therefrom into a region in the lower part of tank 40 where it is caused to become suspended in a lift gas which carries it upwardly through lift pipe 41 to separator 48. A preferred lift gas is steam which is introduced in part from conduit 44 and in part from conduit 46, the relative amounts of steam entering via these conduits being controlled by valves 45 and 47. The lift pipe in this example has a vertical rise of about 230 feet and including lateral travel an overall length of 260 feet and the density of the catalyst stream therein is maintained at about 6 pounds per cubic foot by control of the rate of catalyst and gas entry into the lower end of the lift pipe. There may be pressure drop of about 12½ pounds per square inch due to the flow through the lift pipe, and there must be a corresponding differential pressure between feed tank 40 and separator 42 in order to effect the catalyst transfer. The length of the gravity leg 39 should be sufficient to create a head of catalyst greater than the gaseous pressure differential across its ends. By vertical head of catalyst column and similar expressions is meant that head which may be calculated by dividing the total weight of contact material in the vertical part of the gravity leg above its lower end by the average cross-sectional area of the leg. A small amount of gas from tank 40 passes upwardly through the void spaces between particles in the compact gravity leg 39. The length of leg 39 should be great enough to restrict the velocity of gas flow therethrough below that which would substantially effect the compactness of the feed stream or interfere with the downward solid flow. This requires that the pressure drop in pounds per square inch per unit length of vertical column must be less than the calculated weight of the solid material in that length of column per square inch of its cross-sectional area. For example, for a material of 40 pounds per cubic foot compact flowing stream density the pressure drop due to gas flow per foot of vertical column height must be less than $$\frac{40 \times 1}{144} = .277 \text{ pound per square inch}$$

It will be understood that a compact feed stream creates substantially no hydrostatic head at its lower end of the type created by a vertical standpipe of powdered solids maintained in aerated or fluidized condition. However, in estimating the length of feed stream required to permit compact stream flow against gaseous pressure, it is convenient to express the required leg length in terms of a "calculated head." For short feed streams the calculated head is the quotient of the total weight of contact material in the vertical part of the feed stream above its lower end divided by the horizontal cross-sectional area of the stream. When relatively long streams are required in order to overcome relatively high pressure drops it is necessary to taper the feed leg so that its diameter gradually increases either continuously or in stages at successively higher levels in order to compensate for the effect of gas expansion as it reaches the lower pressure section of the pipe. The leg is tapered to such an extent that the lifting effect of the gas flowing upwardly therethrough is substantially the same throughout the leg length. A tapered feed leg of this type is the subject of claims in United States Patent Number 2,829,087. When a tapered leg is employed, the "calculated head" is the weight of solid particles in the vertical portion of the stream above its lower end divided by the average horizontal cross-sectional area of the stream. If the stream is not vertical much higher lengths are required to permit proper gravity flow against pressure than in the case of vertical feed streams. In general feed streams which are entirely vertical are preferred and if a portion of the feed stream slopes it should be of substantially greater diameter than the vertical portion of the streams. In the arrangement shown, unless the bed in tank 40 is of considerable depth, it may be ignored in calculating the catalyst head and the head calculated to the lower end of pipe 39 may be considered as the head of the gravity leg.

In order to limit the required height of the gravity leg 39 and thereby to limit the elevation of the reaction and regeneration vessels in accordance with the method of this invention, a vacuum is maintained in the separator 42 so that the pressure in tank 40 may be low. Thus, in this example the barometric condenser 50 draws the separated lift steam from separator 42 and condenses it thereby maintaining a vacuum of about 9 pounds per square inch below atmospheric pressure, for example. Thus, the pressure in tank 40 need be only about 3½ pounds per square inch gauge. The gravity packed density of the leg 39 being about 45 pounds per cubic foot for the catalyst involved in this example, the theoretical required length of pipe 39 need be only about 11.0 feet. Allowing a suitable safety factor a length of about 14–15 feet is satisfactory in this example. In general, in order to save height on the conversion unit, the length of leg 39 should be substantially less than and preferably only a minor fraction of the length of lift pipe 41. It will be noted that in this operation the pressure in feed tank 40 is greater than the atmospheric pressure existing adjacent the upper end of the gravity feed column 39, but less than the head of catalyst in said column. Also, the total pressure drop across the lift pipe 41 is substantially greater than that across the gravity leg 39.

Catalyst separated from the lift steam settles onto a bed of catalyst maintained in separator 48 and then gravitates as a gravity compacted column or stream down through the vertical, tapered conduit 54 into a second lift feed zone 55. The effective vertical length of leg 54 is about 220 feet including a minimum bed depth of 10 feet in the separator 48 and the density of the contact material therein is about 45 pounds per cubic foot. Material of this density permits a maximum pressure drop due to upward gas flow therethrough of about 0.31 pound per square inch per vertical foot of leg or 69 pounds per square inch drop across the entire leg. Allowing for a safety factor of about 20 percent the pressure in tank 55 may be about 55 pounds per square inch above that in separator. Thus, sufficient steam is admitted to tank 55 to convey the catalyst upwardly therefrom through pipe 56 to the third separator 57 and to maintain a pressure of about 46 pounds per square inch gauge in tank 55. The pressure in separator 57 is less than that in tank 55 only by the amount of the pressure drop across the lift pipe 56. The rate of contact material and gas entry to the lift 56 is controlled to maintain a stream density of the order of 6 pounds per cubic foot and a pressure drop across the lift pipe of about 12 pounds per square inch. Most of the steam separated from the catalyst in separator 57 passes via conduit 100 to the first lift feed tank 40 as the steam supply therefor. It will be noted that this steam is at a pressure well above that required for tank 40 and its pressure is reduced across the valves 45 and 47. The remainder of the steam from separator 57 is withdrawn via pipe 101 at a rate controlled by diaphragm valve 102 and pressure controller 103 to maintain a pressure of about 33 pounds per square inch gauge in the separator 57. Catalyst from separator 57 passes serially through gravity leg 61 to feed tank 58, lift pipe 67 to separator 63, gravity leg 65 to feed tank 59, lift pipe 68 to separator 64, gravity leg 66 to feed tank 60 and lift pipe 69 to the chamber 15. The feed tanks 58, 59 and 60 are similar to tank 55 and the steam pressures maintained therein are 88, 131 and 174 pounds per square inch gauge respectively. The gravity legs 61, 65 and 66 are similar in length and operation to leg 54. The lift pipes 67 and 68 are similar in length and operation to lift pipe 56, and the final lift pipe 69 is somewhat shorter in length. The separators 63 and 64 are operated in a manner similar to the separator 57 and pressures maintained therein are 76 and 119 pounds per square inch gauge. The lift steam is added to the system from a 200 pound steam main 130 as supply to the last lift feed tank 60. This steam as removed from separator 15 is at about 163 pounds per square inch gauge which is high enough for its use as steam supply to the fourth feed tank 59. The steam passes from chamber 15 towards feed tank 59 via pipe 131 from which it enters tank 59 via pipes 132 and 133. Similarly the steam from the fourth separator 64 is supplied via pipe 134 as lift gas supply to the third lift tank 58 and the steam from the third separator 63 is supplied via pipe 135 as the lift gas for the second lift feed tank 55 is employed as the lift gas for the first lift tank 40. The proper pressure is maintained in chambers 15, 64 and 63 by bleeding off a controlled amount of steam as regulated by valves 137, 138 and 139 in a manner similar to that already discussed in connection with separator 57. If it is desired to operate the reactor at 200 pounds per square inch, it is necessary only to provide one additional gravity and lift stream set to the series.

It will be noted that each set comprising a gravity leg and lift stream subsequent to the first set is operated in such a manner as to effect an increase in the pressure level of the catalyst while the first set is employed simply to effect a net increase in the elevation level of the catalyst. If desired, by varying the levels of the separators, any set may be operated to effect both an increase in pressure and elevational level of the catalyst. When it is desired to effect an increase in pressure level, the rate of gas and catalyst entry to the lift stream from the feed tank and the rate of gas withdrawal from the separator at the upper end of the lift stream are controlled to maintain the pressure drop due to flow in the lift stream or rising leg substantially less than the pressure drop through the preceding gravity leg or descending leg and to maintain the pressure in the separation zone greater than the pressure adjacent the upper end of said preceding descending leg by an amount less than the difference between the head of catalyst in the preceding descending leg and pressure drop through the rising leg. In general, the pressure drop across the lift or rising leg should be only a minor fraction and preferably only about 10–30 percent of the maximum pressure drop allowable across the gravity or descending leg without disruption of the latter. The total pressure maintained in the lift feed zones should be greater than that at the upper end of the gravity leg by usually more than 50 and not more than 80–85 percent of the calculable head of catalyst in the tapered gravity leg. If the gravity leg is not tapered the maximum allowable pressure differential is lower. In general, it has been found that in order to effect a net increase in the catalyst pressure level, the rate of catalyst and lift gas entry into the lift pipe of any given set must be controlled so that the quotient obtained by dividing the pressure drop per unit vertical length of gravity leg by the pressure drop per unit length of lift pipe is always substantially greater than the quotient obtained by dividing the length of the lift pipe by the vertical height of the gravity leg. In this relationship, the pressure drop per unit of tapered gravity leg height must always be less than that corresponding to the calculated catalyst head per same unit of height in said leg. Also, it should be noted that in order to effect an increase in pressure on the catalyst the total pressure drop due to gas flow through the gravity leg should be substantially greater than the pressure drop due to gas and catalyst flow through the following lift pipe.

The relative rates of gas and catalyst flow into the gas lift pipes may be controlled by adjusting the relative amounts of primary steam introduced directly into the lift pipe as from pipe 44 to lift pipe 41 and of secondary steam introduced into the lift pipe only after flow through catalyst bed in the feed tank as from pipe 46. In general, the rate of catalyst entry into the lift pipe increases with increased proportions of secondary steam for the same total steam flow to the lift pipe. In general, the secondary stream may vary from 5 to 90 percent and preferably from 10 to 35 percent of the total gas supplied to the lift pipe. This method of regulating the flow of catalyst and gas entering the lift pipe is described and claimed in my application Serial Number 76,017, filed in the United States Patent Office February 12, 1949. It is contemplated that any of the equivalent lift feed systems described in that application may be substituted for the particular lift feed tank arrangement described herein. Another lift feed tank arrangement which may be employed is the one disclosed in application Serial Number 97,274, filed by Crowley in the United States Patent Office June 4, 1949, now Patent Number 2,676,142.

It will be noted that the use of vacuum and pressure together on lift 41 shown in Figure 2 and on lift 105 shown in Figure 1 permits the transfer of catalyst to a higher elevation and is feasible commercially by means of a lift using vacuum alone. In other words, the total pressure drop across the lift may be greater than the amount of vacuum which can be feasibly provided commercially, i. e., greater than about 13.4 pounds per square inch. Also, the catalyst is transferred by this arrangement to a much higher elevation than would be possible employing a pressure lift alone without greatly increasing the length of the gravity feed leg feeding the lift feed zone, for example, leg 39 in Figure 2, and thereby greatly increasing the overall height of the unit. Usually by means of this invention, the vertical height required for the gravity feed leg supplying the lift feed zone may amount to only about 15 feet or less.

As is shown in Figure 1, where it is not desired to build up the pressure level on the catalyst during its transfer, i. e., where the converter and regenerator are operated at substantially the same pressure or where any difference in pressure was taken care of by the gravity feed leg above the reactor, the catalyst may flow through such gravity feed leg directly from the vacuum separator to the second contacting vessel. It is contemplated that in the preferred form of this invention a vent be provided at an intermediate location in the passage between the lift feed zone and the contactor supplying the same. Catalyst passes downwardly from the contactor to the vent region as a compact confined seal stream of restricted cross-section. Catalyst passes downwardly from the vent region as a compact stream of restricted cross-section and of sufficient vertical height to overcome the super-atmospheric pressure in the lift feed region. A small amount of seal gas or lift gas will escape upwardly from the lift feed region through the gravity feed leg to be removed at the vent. Similarly a small amount of gas may pass downwardly through the seal leg from the contactor to the vent zone and this gas is also removed via the vent. It is contemplated that this invention also applies to those less preferred operations wherein the contactor supplying the lift feed region is operated at a pressure substantially below that in the lift feed region and wherein the catalyst is passed downwardly as a gravitating continuous column from the contactor into the lift feed region, without an intermediate vent. In general, the invention applies to such operations only when the pressure differential between the lift feed region and the contactor is less than about 5 pounds per square inch and preferably less than about 3 pounds per square inch.

It will be noted that by the further improvement shown in Figure 2, it is possible to conduct a reforming operation at the desired elevated pressures while at the same time the catalyst regeneration may be conducted at substantially atmospheric pressure thereby permitting better control of the contaminant combustion reaction and eliminating the expense of compressing the regeneration gas to high pressures. This is accomplished, without the use of complicated pressure lock systems or catalyst damaging gas-tight valves for introduction of catalyst to the reforming zone and for withdrawal of catalyst therefrom. In addition, the long gravity feed leg normally provided above the reactor in commercial systems employing granular catalysts has been eliminated thereby saving on the overall height of the unit. This is accomplished by means of operating the several sets of gravity legs and lift streams in such a manner that the pressure drop across each gravity leg is greater than that across the next lift pipe and by properly regulating the rate of gas withdrawal from the several separators. Also, it will be noted that the gravity leg and gas lift system is positioned so as to occupy, for the most part, the same range of elevations as the reactor and regenerator. By passing the same steam through all of the lifts in series in reverse direction to the catalyst advance, a very substantial reduction in lift gas requirements is effected over what would be required if a separate lift gas were supplied to each lift.

It will be understood that while five sets of gravity legs and lift streams are employed in the example discussed hereinabove, the invention is not restricted in the number of sets which may be employed. By increasing the number of sets the overall height of the gravity legs and lift streams may be reduced. Such a reduction may also be obtained by operating the lift streams at a low density, for example 2 pounds per cubic foot. Also, it is contemplated that the gravity legs and lift streams in each set may vary in height from those in other sets and that the gravity leg in any given set may be longer or shorter than the lift pipe. The separators may be positioned all on one level as shown or at different levels.

It is also contemplated that the last lift may discharge directly above the bed in the reactor and the phrase "region from which the catalyst may gravitate onto the bed in the reforming zone" is employed in a broad sense as covering delivery of catalyst into a separator or directly into the reactor above the bed therein.

It will be understood that the invention is not limited to the specific reactor, regenerator and separator construction described herein and that the construction of these vessels may vary along lines well known to those skilled in the art. The contacting vessels may be arranged differently relative to each other than described hereinabove. For example, the convertor and reconditioner may be positioned side by side in which case an additional means will be required to transfer solids from the high to the low pressure zone.

It will be understood that the invention is not limited to the specific processes described in detail hereinabove or to the process conditions given in the examples. In general, for catalytic cracking operations, conversion pressures in the range 5 to 50 pounds per square inch gauge are desirable with kiln pressures ranging from atmospheric to 50 pounds per square inch gauge. The conversion temperatures may range from about 800 to 1200° F. while the catalyst regeneration temperatures range from about 800 to 1200° F. and up to about 1400° F. for synthetic gel type catalyst. Usually space velocities in the reactor are within the range of 0.5 to 20 volumes of oil per volume of catalyst per hour (measured as a liquid at 60° F.). Catalyst oil ratios range from about 0.5 to 20 weight basis.

Operating conditions for reforming are usually of the same order of magnitude as those employed for catalytic cracking although space velocities of catalyst oil ratios are usually lower. The form of the invention shown in Figure 2 may be applied to reforming operations wherein the pressures are of the order of 30 to 100 pounds per square inch gauge with catalyst regeneration at lower pressures.

In its broadest form, the invention is not limited to any particular range of gas velocities or contact material stream densities in the lift pipe. In general, the proper velocities may vary widely depending upon the dimensions of the particular lift involved and depending upon the location in the lift at which the velocity is measured. For example, it has been found in commercial lifts of the low stream density type that proper linear gas velocities may be of the order of 140 feet per second at the lower end of the lift and about 60 feet per second at the upper end thereof. On the other hand, for the same lift the proper catalyst velocities range from about 65 feet per second at the lower end of the lift to about 17 feet per second at the upper end thereof. In the broadest form of the invention, it is contemplated that the stream density of the lift may range from 0.5 to 30 pounds per cubic foot and sometimes higher (based on a contact material having a flowing density of 45 pounds per cubic foot and a particle size of 4–16 mesh Tyler). The proper operating conditions within low density air lifts are disclosed and claimed in application Serial Number 298,592, filed July 12, 1952.

According to the method of this invention, the pressure drop across the lift is provided in part by vacuum maintained in the lift separator and in part by means of gas introduced into the lift feed zone under superatmospheric pressure. It is usually preferred, in accordance with this invention, to provide at least 50 percent and preferably at least 70 percent of the total pressure drop across the lift passage by means of the vacuum. While the invention is not considered in all cases to be limited thereto, it has been found to be particularly advantageous in operations wherein the total pressure drop across the lift passage is in excess of the amount of vacuum which can be feasibly provided commercially, i. e., in excess of 13.4 pounds per square inch.

In the gravity feed legs, the contact material should be maintained in substantially compact condition unsuspended in gas except possibly for a small percentage of fines. The rate of contact material flow in the feed legs is controlled by the rate of contact material entry into the gas lift pipes. The gravity feed leg should obey the ordinary laws of granular solid material flow exhibiting an angle of repose and an angle of internal flow. This state of flow should be distinguished from the so-called dense fluidized phase in which the contact material is actually in gaseous suspension and follows many of the laws of liquid flow.

It should be understood that the examples of process application of this invention and of operation conditions are merely illustrative and are not to be construed as limiting the scope of this invention except as it may be limited by the following claims.

I claim:

1. A method for transferring a granular contact material from a low elevation in one contacting zone to a location from which it may be more conveniently transferred to a substantially higher elevation in a second contacting zone which method comprises, withdrawing the contact material from the lower section of one of the contacting zones and passing it downwardly as a substantially compact gravity feed column to a lift feed region maintained above atmospheric pressure, causing said contact material near the lower end of said column to become suspended in a stream of a suitable lift gas supplied into said lift feed region at a pressure greater than atmospheric pressure and greater than that at the upper end of said gravity feed column but less than the quotient obtained by dividing the weight of the contact material in said gravity feed column by the average horizontal cross-sectional area of said gravity feed column, passing the stream of lift gas and suspended contact material upwardly as a confined lift stream into a separation zone located a substantial distance above the point of contact material withdrawal from said first contacting zone, effecting separation of lift gas from contact material in said separation zone and sucking the lift gas from said separation zone to maintain it under a substantial vacuum and thereby to aid in lifting the contact material in said lift stream, the length and vertical rise of said lift stream being such and the rate of contact material transfer therein being maintained such that the pressure drop across said lift stream is substantially in excess of the pressure against which contact material would gravitate in said gravity feed column if such pressure were maintained at the lower end thereof and substantially in excess of the vacuum in said separation zone.

2. In a process for conversion of hydrocarbons wherein a granular contact material is passed cyclically through two contacting zones, one being a reaction zone wherein the contact material is contacted with a fluid hydrocarbon charge to effect the conversion thereof and the other being a reconditioning zone wherein the contact material is contacted with a suitable reconditioning gas to recondition it for reuse in the reaction zone the method for transferring contact material from one of said zones to a higher level above the other contacting zone which comprises: withdrawing the contact material from the lower section of one of said contacting zones and passing it onto the surface of an upright substantially compact, vertical gravity feed column of contact material, maintaining the pressure substantially atmospheric at the upper end of said column, causing said contact material near the lower end of said column to become suspended in a stream of a suitable lift gas supplied to maintain a pressure greater than atmospheric pressure but below that corresponding to the head of contact material in said column, passing the stream of lift gas and suspended contact material upwardly as a confined lift stream into a separation zone located above the other contacting zone and a substantial distance above the upper end of said feed column, said lift stream being of substantially greater length than said feed column, effecting separation of lift gas from contact material in said separation zone and sucking the lift gas from said separation zone to maintain it under a substantial vacuum and thereby to aid in lifting the catalyst in said lift stream, the total pressure drop across said lift stream being substantially greater than the pressure corresponding to the calculated head of said feed column and substantially greater than the amount of vacuum which could be feasibly provided commercially.

3. In a process for conversion of hydrocarbons wherein a granular contact material made up of particles having average diameters within the range about 0.006 to 0.25 inch is passed cyclically through two contacting zones, one being a reaction zone wherein the contact material is contacted as a substantially compact moving bed with a fluid hydrocarbon charge to effect the conversion thereof and the other being a reconditioning zone wherein the contact material is contacted as a substantially compact moving bed with a suitable reconditioning gas to recondition it for reuse in the reaction zone and wherein one of said contacting zones is maintained under a gaseous pressure substantially above that in the other contacting zone the method for transferring contact material from the lower pressure contacting zone to the higher pressure contacting zone which comprises: withdrawing contact material from the lower section of the lower pressure contacting zone and passing it onto the surface of an upright substantially compact, vertical gravity feed column of contact material, said column creating substantially no hydrostatic head at its lower end, causing said contact material near the lower end of said column to become suspended in a lift feed region in a stream of a suitable lift gas supplied to maintain said lift feed region at a pressure greater than atmospheric pressure but below that corresponding to the value of the quotient obtained by dividing the weight of contact material in the vertical portion of said column by the average horizontal cross-sectional area thereof, whereby a small amount of gas is forced upwardly through said column at a rate insufficient to effect the compactness thereof, venting said gas from the upper end of said column so as to maintain it at substantially atmospheric pressure, passing the stream of lift gas and suspended contact material upwardly as a confined lift stream into a separation zone located above the other contacting zone and a substantial distance above the upper end of said feed column, said lift stream being of substantially greater length than said feed column, effecting separation of lift gas from contact material in said separation zone and sucking the lift gas from said separation zone to maintain it under a substantial vacuum and thereby to aid in lifting the catalyst in said lift stream, the total pressure drop across said lift stream being substantially greater than the pressure drop across said feed column and substantially greater than the amount of vacuum which could be feasibly provided commercially, passing the contact material downwardly from said separation zone through a closed series of pressure-building sets each set comprising a gravity feed column, lift feed zone, lift stream and separation zone, the gravity column and lift stream of each set having their lower ends opening into a common lift feed zone and each lift stream and the gravity leg of the next set in series opening on their upper ends into a common separation zone, introducing a suitable lift gas into the feed zone in each of said sets at a rate controlled to maintain a pressure therein above the pressure at the upper end of the gravity column delivering thereinto by an amount which is less than the quotient of the weight of contact material in the vertical portion of the column divided by the average horizontal cross-sectional area thereof, further controlling the rate of gas and contact material entry into the communicating lift stream and controlling the rate of gas withdrawal from the separation zone in each set to maintain the pressure drop due to flow in the lift stream in each of said sets substantially less than the pressure drop through the preceding gravity column and to maintain the pressure in the separation zone in each of said sets substantially greater than the pressure in the preceding separation zone by an amount not greater than the difference between said quotient for the preceding gravity column and the pressure drop through the lift stream which discharges into said separation zone, whereby the pressure progressively increases in successive separation zones in the series until it reaches a pressure in the last separation zone which is near that in the higher pressure contacting zone, said last separation zone being located only a short distance above said higher pressure contacting zone and at a substantially higher elevation than the upper end of the first named gravity column which feeds the first lift feed zone, and flowing the contact material downwardly from the last separation zone into the upper section of said higher pressure contacting zone.

4. In a process for conversion of hydrocarbons wherein a granular contact material made up of particles having average diameters within the range about 0.006 to 0.25 inch is passed cyclically through two contacting zones maintained under substantially different gaseous pressures, one of said zones being a reaction zone wherein the contact material is contacted with a fluid hydrocarbon charge to effect conversion thereof and the other of said zones being a reconditioning zone in which the contact material is contacted as a compact bed with a suitable reconditioning gas at a pressure substantially different from that in said reaction zone to effect reconditioning of the contact material for reuse in said reaction zone, the improved method of transferring contact material from the lower pressure contacting zone to the higher pressure contacting zone which comprises: flowing the contact material downwardly from the lower pressure contacting zone onto a compact gravity leg of contact material extending vertically downwardly to a confined lift feed zone therebelow, the upper end of said gravity leg being maintained near atmospheric pressure, causing said contact material in said feed zone to become suspended in a stream of suitable lift gas supplied into said feed zone to maintain it at a pressure substantially above atmospheric pressure but less than the quotient obtained by dividing the weight of the contact material in said gravity leg by the average horizontal cross-sectional area of said gravity leg, passing the stream of lift gas and suspended contact material upwardly as a confined lift stream of low density relative to said gravity leg to a separation zone located at a level a substantial distance above the level of the upper end of said gravity leg, sucking the lift gas from said separation zone to maintain it under a substantial vacuum and thereby to aid in lifting the contact material in said lift stream, the total pressure drop across said lift stream being substantially greater than the vacuum which can be feasibly provided commercially and greater than the quotient obtained by dividing the weight of the contact material in said gravity leg by its average horizontal cross-sectional area, passing the contact material from said separation zone through at least one set comprising a vertical gravity feed leg, lift feed zone, lift stream and separation zone, and controlling the rate of gas and contact material entry to each lift stream and throttling the gas withdrawal from the separation zone of each set to maintain the pressure drop due to flow in each lift stream substantially less than the pressure drop through the preceding gravity leg and to maintain the pressure in each of the separation zones substantially greater than the pressure adjacent the upper end of the preceding gravity leg, whereby the gaseous pressure on the contact material is gradually increased until it is discharged from the last lift stream into a confined region maintained at a pressure near that in the higher pressure contacting zone and located a substantial distance above the upper end of the first gravity leg but only a short distance above the level of the bed in said higher pressure contacting zone and flowing the contact material downwardly from said region onto said bed in the higher pressure contacting zone.

5. In a method for conversion of hydrocarbons in the presence of a granular contact material catalyst which passes downwardly as a compact columnar mass through two contacting zones in series, one being a hydrocarbon conversion zone and the other being a contact material reconditioning zone and is circulated pneumatically from a lift feed zone located not more than about 15 feet below the lower of said contacting zones to a location from which it may flow downwardly by gravity to a bed of said contact material maintained in the upper contacting zone, the improved method for effecting circulation of said contact material which comprises: passing the contact material downwardly from the lower contacting zone as at least one substantially compact unobstructed stream of restricted cross-section onto the surface of a bed of said contact material in a confined lift feed zone, said stream being substantially vertical along at least most of its length, venting said stream to substantially atmospheric pressure at an intermediate location along its length, introducing a suitable lift gas into said lift feed zone to maintain a superatmospheric pressure therein and to carry the contact material upwardly from a location below the surface of said bed in the lift feed zone through a confined lift passage to a separation zone maintained at a level above the upper contacting zone, effecting separation of lift gas from contact material in said separation zone and sucking the gas therefrom to maintain it under a vacuum and thereby aid in the lifting of the contact material through the lift stream, the pressure drop due to flow through the lift passage being substantially in excess of either the vacuum in the separator or the pressure in the lift feed zone and equal to the sum of the two and substantially in excess of that against which said contact material stream could feed if maintained within the lift feed zone, the pressure in the lift feed zone being substantially in excess of atmospheric pressure but less than the quotient obtained by dividing the weight of the contact material in said gravity feed stream by the average horizontal cross-sectional area thereof, and flowing the contact material downwardly from said separation zone as at least one elongated confined seal column of restricted cross-section into the upper contacting zone.

References Cited in the file of this patent
UNITED STATES PATENTS

| | | |
|---|---|---|
| 2,593,404 | Barker | Apr. 22, 1952 |
| 2,621,148 | Barker | Dec. 9, 1952 |
| 2,666,731 | Bergstrom | Jan. 19, 1954 |
| 2,676,142 | Crowley | Apr. 20, 1954 |
| 2,684,927 | Bergstrom | July 27, 1954 |